US011423315B2

(12) United States Patent
Chang et al.

(10) Patent No.: US 11,423,315 B2
(45) Date of Patent: Aug. 23, 2022

(54) QUANTIZATION METHOD FOR PARTIAL SUMS OF CONVOLUTION NEURAL NETWORK BASED ON COMPUTING-IN-MEMORY HARDWARE AND SYSTEM THEREOF

(71) Applicant: NATIONAL TSING HUA UNIVERSITY, Hsinchu (TW)

(72) Inventors: Meng-Fan Chang, Hsinchu (TW); Jing-Hong Wang, Hsinchu (TW); Ta-Wei Liu, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 430 days.

(21) Appl. No.: 16/784,218

(22) Filed: Feb. 6, 2020

(65) Prior Publication Data
US 2021/0248478 A1    Aug. 12, 2021

(51) Int. Cl.
*G06N 3/10* (2006.01)
*G06N 3/08* (2006.01)
*G06N 3/04* (2006.01)
*G06F 7/544* (2006.01)

(52) U.S. Cl.
CPC ............. *G06N 3/10* (2013.01); *G06N 3/0472* (2013.01); *G06N 3/08* (2013.01); *G06F 7/5443* (2013.01)

(58) Field of Classification Search
CPC .......... G06N 3/10; G06N 3/0472; G06N 3/08; G06F 7/5443
See application file for complete search history.

(56) References Cited

U.S. PATENT DOCUMENTS

2019/0188237 A1*   6/2019   Chen ................... G06N 3/04

OTHER PUBLICATIONS

Wu, Yueh-Chi, and Chih-Tsun Huang. "Efficient dynamic fixed-point quantization of CNN inference accelerators for edge devices." 2019 International Symposium on VLSI Design, Automation and Test (VLSI-DAT). IEEE, 2019. (Year: 2019).*
Sun, Xiaoyu, et al. "Computing-in-memory with SRAM and RRAM for binary neural networks." 2018 14th IEEE International Conference on Solid-State and Integrated Circuit Technology (ICSICT). IEEE, 2018. (Year: 2018).*
Lee, Jun Haeng, et al. "Quantization for rapid deployment of deep neural networks." arXiv preprint arXiv:1810.05488 (2018). (Year: 2018).*

* cited by examiner

*Primary Examiner* — Kevin W Figueroa
(74) *Attorney, Agent, or Firm* — CKC & Partners Co., LLC (57) ABSTRACT

A quantization method for a plurality of partial sums of a convolution neural network based on a computing-in-memory hardware includes a probability-based quantizing step and a margin-based quantizing step. The probability-based quantizing step includes a network training step, a quantization-level generating step, a partial-sum quantizing step, a first network retraining step and a first accuracy generating step. The margin-based quantizing step includes a quantization edge changing step, a second network retraining step and a second accuracy generating step. The quantization edge changing step includes changing a quantization edge of at least one of a plurality of quantization levels. The probability-based quantizing step is performed to generate a first accuracy value, and the margin-based quantizing step is performed to generate a second accuracy value. The second accuracy value is greater than the first accuracy value.

20 Claims, 5 Drawing Sheets

QUANTIZATION METHOD FOR PARTIAL SUMS OF CONVOLUTION NEURAL NETWORK BASED ON COMPUTING-IN-MEMORY HARDWARE AND SYSTEM THEREOF

BACKGROUND

Technical Field

The present disclosure relates to a quantization method for a plurality of partial sums of a convolution neural network and a system thereof. More particularly, the present disclosure relates to a quantization method for a plurality of partial sums of a convolution neural network based on a computing-in-memory hardware and a system thereof.

Description of Related Art

In these years, due to the industrial growth of mobile device, medical electrical equipment, portable storage, etc., requirement of memory with low power, high speed and high density is increased. Computation-in-Memory (CIM) is a promising solution to improve the energy efficiency of multiply-and-accumulate (MAC) operations for AI chips, and multiple-bit convolutional neural network (CNN) is required for high inference accuracy in many applications.

In the study of deep CNN accelerators, a CIM hardware is one of the accelerated computational units that accelerates the operation of CNN. The CIM hardware can support multiple input and multiplication of multiple memory values to get a partial sum, but the partial sum output through the memory unit is not full precision, so that calculation errors may occur, and these partial sums will be added up to obtain the final sum for the activation function. Once this phenomenon occurs, a prediction accuracy value of the CNN will be reduced. Therefore, a quantization method for a plurality of partial sums of a CNN based on a CIM hardware and a system thereof having the features of quantizing the partial sum with considering hardware error and improving the prediction accuracy value of the CNN are commercially desirable.

SUMMARY

According to one aspect of the present disclosure, a quantization method for a plurality of partial sums of a convolution neural network based on a computing-in-memory (CIM) hardware includes a probability-based quantizing step and a margin-based quantizing step. The probability-based quantizing step includes a network training step, a quantization-level generating step, a partial-sum quantizing step, a first network retraining step and a first accuracy generating step. The network training step includes training the convolution neural network to generate the partial sums from the CIM hardware and then obtain a benchmark training result, and each of the partial sums is in a full precision format. The quantization-level generating step includes generating a plurality of quantization levels for quantizing the partial sums according to a number of each of the partial sums, and each of the quantization levels includes a quantization edge. The partial-sum quantizing step includes quantizing the partial sums at the quantization levels to generate a plurality of first quantized partial sums. The first network retraining step includes retraining the convolution neural network with the first quantized partial sums to obtain a first training result. The first accuracy generating step includes comparing the first training result with the benchmark training result to generate a first accuracy value. The margin-based quantizing step includes a quantization edge changing step, a second network retraining step and a second accuracy generating step. The quantization edge changing step includes changing the quantization edge of at least one of the quantization levels to generate a plurality of second quantized partial sums. The second network retraining step includes retraining the convolution neural network with the second quantized partial sums to obtain a second training result. The second accuracy generating step includes comparing the second training result with the benchmark training result to generate a second accuracy value. The second accuracy value is greater than the first accuracy value.

According to another aspect of the present disclosure, a quantization method for a plurality of partial sums of a convolution neural network based on a CIM hardware includes a probability-based quantizing step and a margin-based quantizing step. The probability-based quantizing step includes a network training step, a quantization-level generating step, a partial-sum quantizing step, a first network retraining step and a first accuracy generating step. The network training step includes training the convolution neural network to generate the partial sums from the CIM hardware and then obtain a benchmark training result, and each of the partial sums is in a full precision format. The quantization-level generating step includes generating a plurality of quantization levels for quantizing the partial sums according to a number of each of the partial sums, and each of the quantization levels includes a quantization edge. The partial-sum quantizing step includes quantizing the partial sums at the quantization levels to generate a plurality of first quantized partial sums. The first network retraining step includes retraining the convolution neural network with the first quantized partial sums to obtain a first training result. The first accuracy generating step includes comparing the first training result with the benchmark training result to generate a first accuracy value. The margin-based quantizing step includes a quantization edge changing step, a second network retraining step, a second accuracy generating step and an accuracy checking step. The quantization edge changing step includes changing the quantization edge of at least one of the quantization levels to generate a plurality of second quantized partial sums. The second network retraining step includes retraining the convolution neural network with the second quantized partial sums to obtain a second training result. The second accuracy generating step includes comparing the second training result with the benchmark training result to generate a second accuracy value. The accuracy checking step includes checking whether the second accuracy value is greater than the first accuracy value to determine changing of the quantization edge in the quantization edge changing step.

According to further another aspect of the present disclosure, a system of a quantization method for a plurality of partial sums of a convolution neural network based on a CIM hardware includes a memory and a processor. The processor is signally connected to the memory and configured to implement the quantization method for the partial sums of the convolution neural network based on the CIM hardware. The quantization method for the partial sums of the convolution neural network based on the CIM hardware includes a probability-based quantizing step and a margin-based quantizing step. The probability-based quantizing step includes a network training step, a quantization-level generating step, a partial-sum quantizing step, a first network retraining step and a first accuracy generating step. The network training step includes training the convolution neural network to generate the partial sums from the CIM hardware and then obtain a benchmark training result, and each of the partial sums is in a full precision format. The quantization-level generating step includes generating a plurality of quantization levels for quantizing the partial sums according to a number of each of the partial sums, and each of the quantization levels includes a quantization edge. The partial-sum quantizing step includes quantizing the partial sums at the quantization levels to generate a plurality of first quantized partial sums. The first network retraining step includes retraining the convolution neural network with the first quantized partial sums to obtain a first training result. The first accuracy generating step includes comparing the first training result with the benchmark training result to generate a first accuracy value. The margin-based quantizing step includes a quantization edge changing step, a second network retraining step and a second accuracy generating step. The quantization edge changing step includes changing the quantization edge of at least one of the quantization levels to generate a plurality of second quantized partial sums. The second network retraining step includes retraining the convolution neural network with the second quantized partial sums to obtain a second training result. The second accuracy generating step includes comparing the second training result with the benchmark training result to generate a second accuracy value. The second accuracy value is greater than the first accuracy value.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
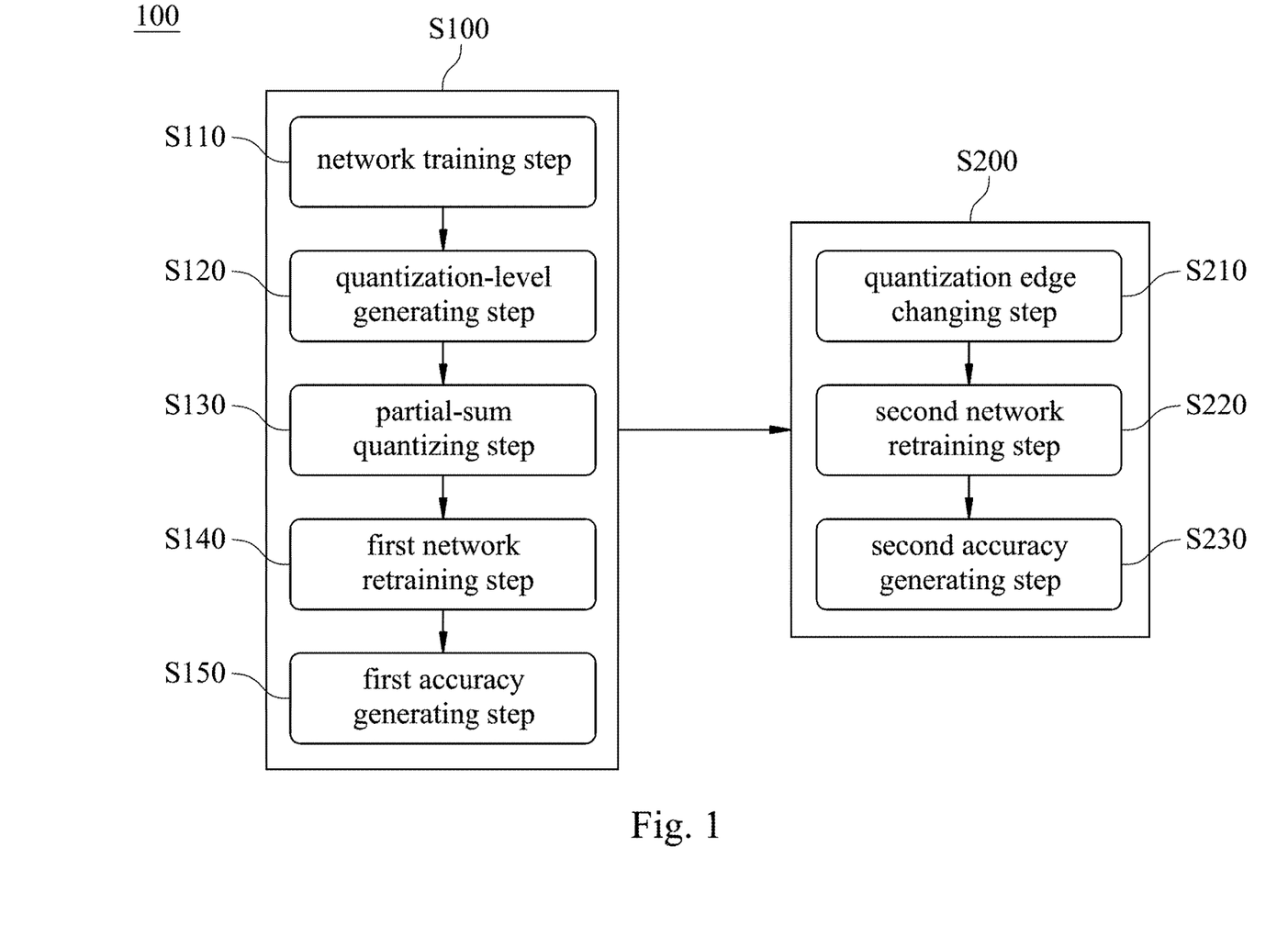
FIG. 1 shows a flow chart of a quantization method for a plurality of partial sums of a convolution neural network based on a computing-in-memory (CIM) hardware according to a first embodiment of the present disclosure.
Figure 2:
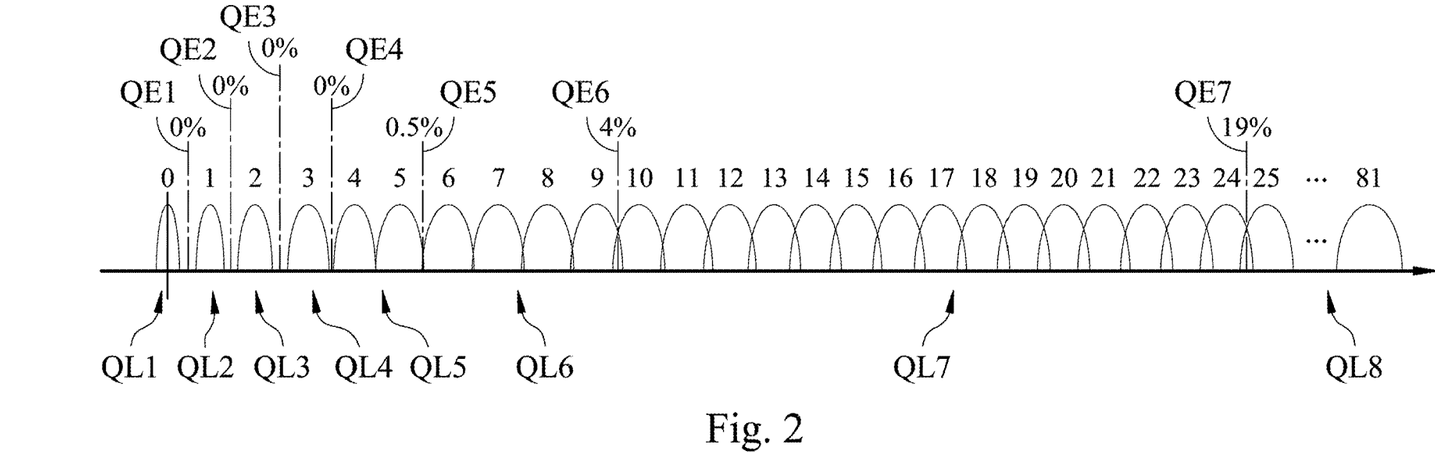
FIG. 2 shows a schematic view of a partial-sum distribution of each of the partial sums and a plurality of quantization levels in a probability-based quantizing step of the quantization method of FIG. 1.
Figure 3:
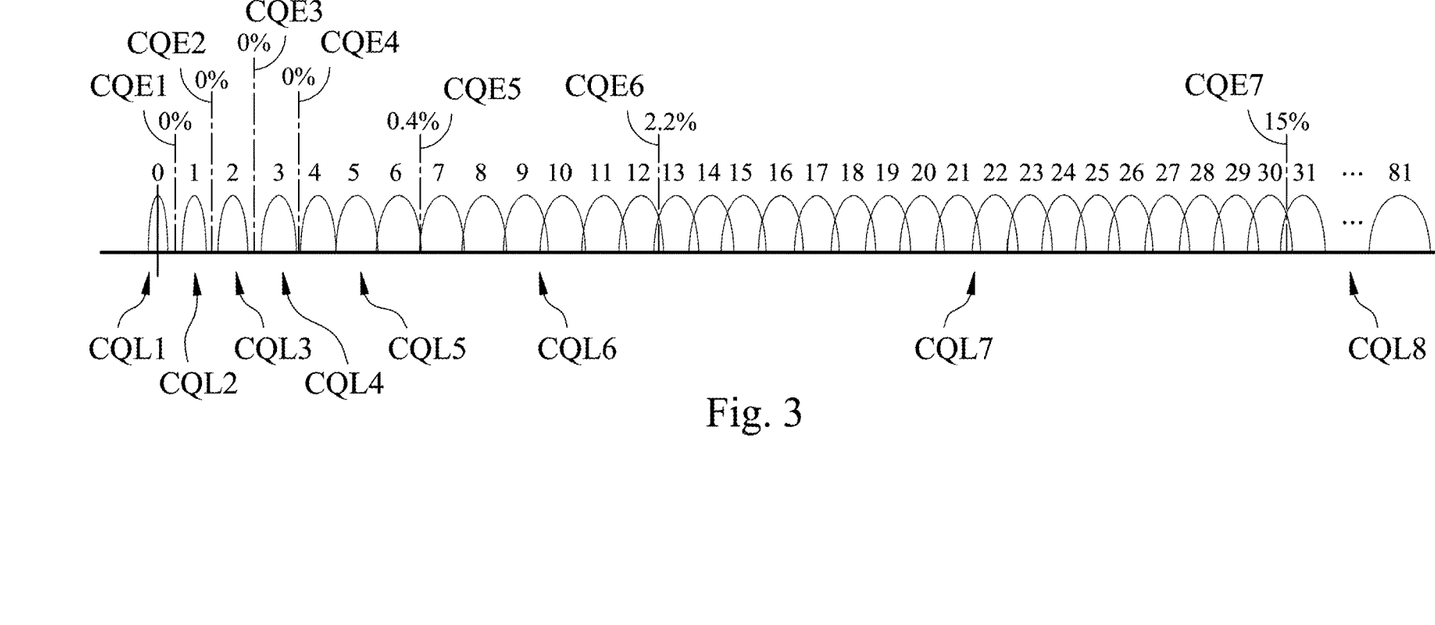
FIG. 3 shows a schematic view of the partial-sum distribution of each of the partial sums and a plurality of changed quantization levels in a margin-based quantizing step of the quantization method of FIG. 1.

FIG. 1 shows a flow chart of a quantization method 100 for a plurality of partial sums of a convolution neural network based on a computing-in-memory (CIM) hardware according to a first embodiment of the present disclosure. FIG. 2 shows a schematic view of a partial-sum distribution of each of the partial sums and a plurality of quantization levels in a probability-based quantizing step S100 of the quantization method 100 of FIG. 1. FIG. 3 shows a schematic view of the partial-sum distribution of each of the partial sums and a plurality of changed quantization levels in a margin-based quantizing step S200 of the quantization method 100 of FIG. 1. In FIG. 1, the quantization method 100 includes a probability-based quantizing step S100 and the margin-based quantizing step S200.

The probability-based quantizing step S100 includes a network training step S110, a quantization-level generating step S120, a partial-sum quantizing step S130, a first network retraining step S140 and a first accuracy generating step S150.

The network training step S110 includes training the convolution neural network to generate the partial sums from the CIM hardware and then obtain a benchmark training result, and each of the partial sums is in a full precision format.

The quantization-level generating step S120 includes generating a plurality of quantization levels (e.g., QL1, QL2, QL3, QL4, QL5, QL6, QL7 and QL8 in FIG. 2) for quantizing the partial sums according to a number of each of the partial sums, and each of the quantization levels includes a quantization edge (e.g., one of QE1, QE2, QE3, QE4, QE5, QE6 and QE7 in FIG. 2).

The partial-sum quantizing step S130 includes quantizing the partial sums at the quantization levels to generate a plurality of first quantized partial sums.

The first network retraining step S140 includes retraining the convolution neural network with the first quantized partial sums to obtain a first training result.

The first accuracy generating step S150 includes comparing the first training result with the benchmark training result to generate a first accuracy value.

The margin-based quantizing step S200 includes a quantization edge changing step S210, a second network retraining step S220 and a second accuracy generating step S230.

The quantization edge changing step S210 includes changing the quantization edge of at least one of the quantization levels to generate a plurality of second quantized partial sums. In detail, the quantization edge changing step S210 further includes moving the quantization edge in a moving direction by at least one reference position so as to increase a number of the partial sums in the quantization levels, and then changing the quantization edge of the at least one of the quantization levels to generate a plurality of changed quantization levels (e.g., CQL1, CQL2, CQL3, CQL4, CQL5, CQL6, CQL7 and CQL8 in FIG. 3). The partial sums are sequentially increased in the moving direction. Each of the changed quantization levels includes a changed quantization edge (e.g., one of CQE1, CQE2, CQE3, CQE4, CQE5, CQE6 and CQE7 in FIG. 3). In the embodiment of FIGS. 2 and 3, each of the partial sums is generated by a plurality of n-bit inputs and a plurality of m-bit weights via the CIM hardware. n is equal to 2, and m is equal to 3. A range of the partial sums is set from −81 to 81. Each of the partial sums has 8 bits. Each of the first quantized partial sums has 4 bits, and each of the second quantized partial sums has 4 bits. The moving direction is a right direction. The partial sums in a fifth quantization level QL5 are 4 and 5, respectively, and the quantization edge QE5 of the fifth quantization level QL5 is located between the partial sums 5 and 6 before the quantization edge changing step S210. The partial sums in a fifth changed quantization level CQL5 are 4, 5 and 6, respectively, and the changed quantization edge QE5 of the fifth quantization level CQL5 is located between the partial sums 6 and 7 after the quantization edge changing step S210. In other words, the quantization edge QE5 is moved in the moving direction by one reference position so as to form the changed quantization edge QE5.

The second network retraining step S220 includes retraining the convolution neural network with the second quantized partial sums to obtain a second training result.

The second accuracy generating step S230 includes comparing the second training result with the benchmark training result to generate a second accuracy value. The second accuracy value is greater than the first accuracy value.

Therefore, the quantization method 100 of the present disclosure can determine the quantization edges by the probability-based quantizing step S100, and then change the quantization edges to form the changed quantization edges by the margin-based quantizing step S200, thereby reducing the MAC error rates of the CIM hardware. After considering the MAC error rates of the CIM hardware, the accuracy value of the convolution neural network of the margin-based quantizing step S200 combined with the probability-based quantizing step S100 can be greater than the accuracy value of the convolution neural network of the probability-based quantizing step S100.

Figure 4:
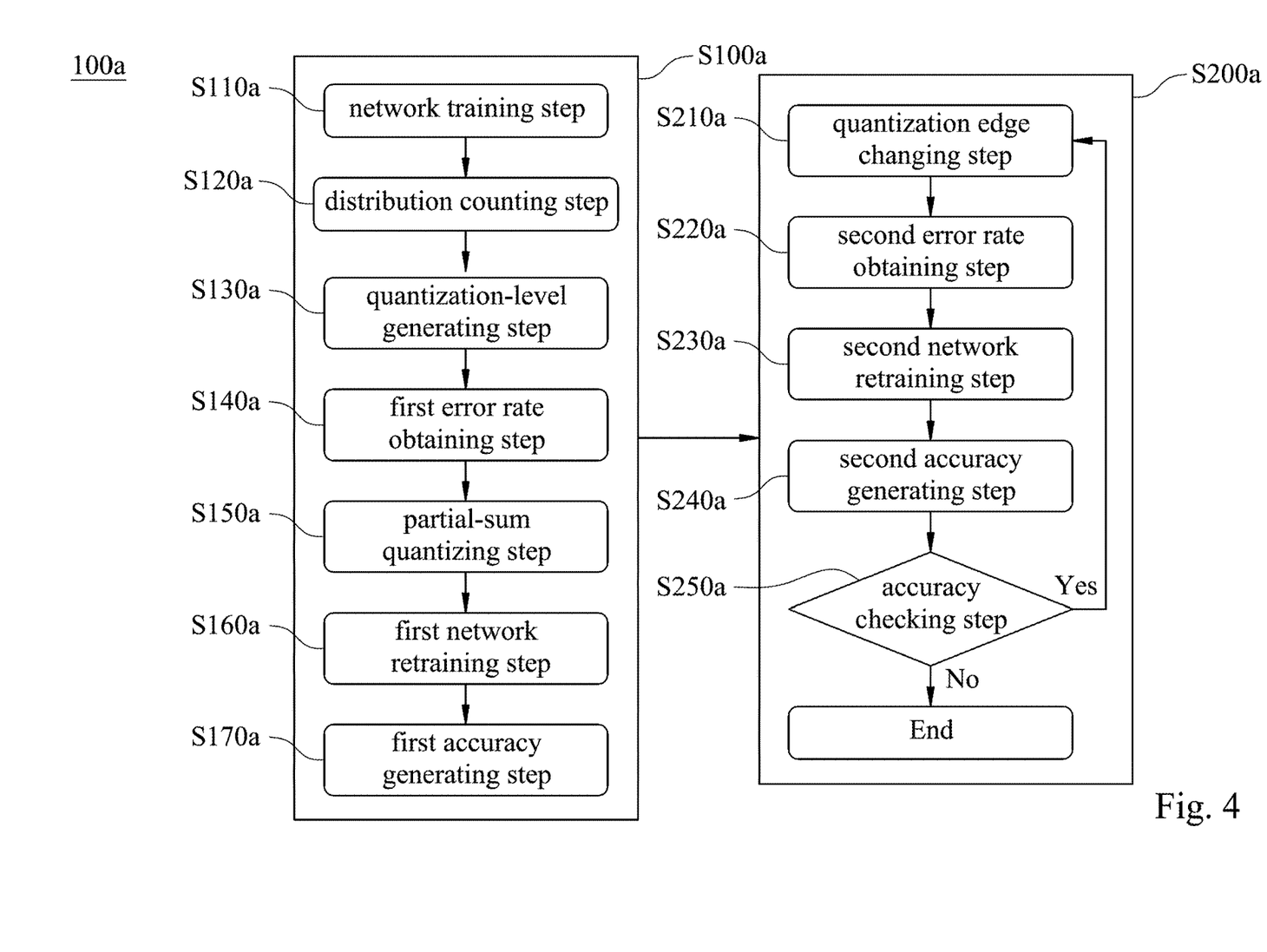
FIG. 4 shows a flow chart of a quantization method for a plurality of partial sums of a convolution neural network based on a CIM hardware according to a second embodiment of the present disclosure.
Figure 5:
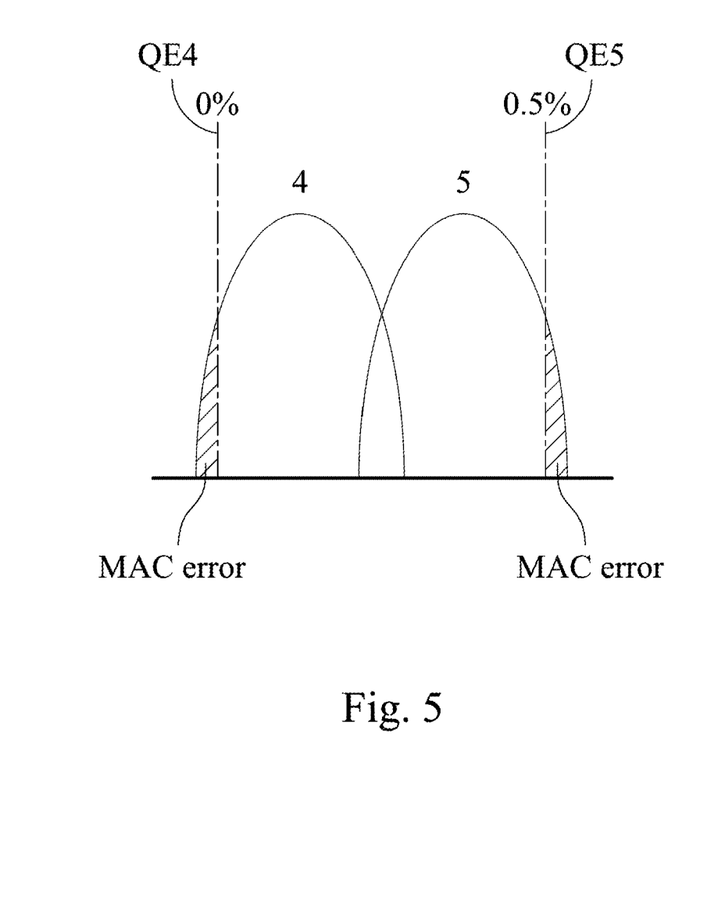
FIG. 5 shows a schematic view of a multiply-and-accumulate (MAC) error rate of one of a plurality of quantization levels according to a third embodiment of the present disclosure.
Figure 6:
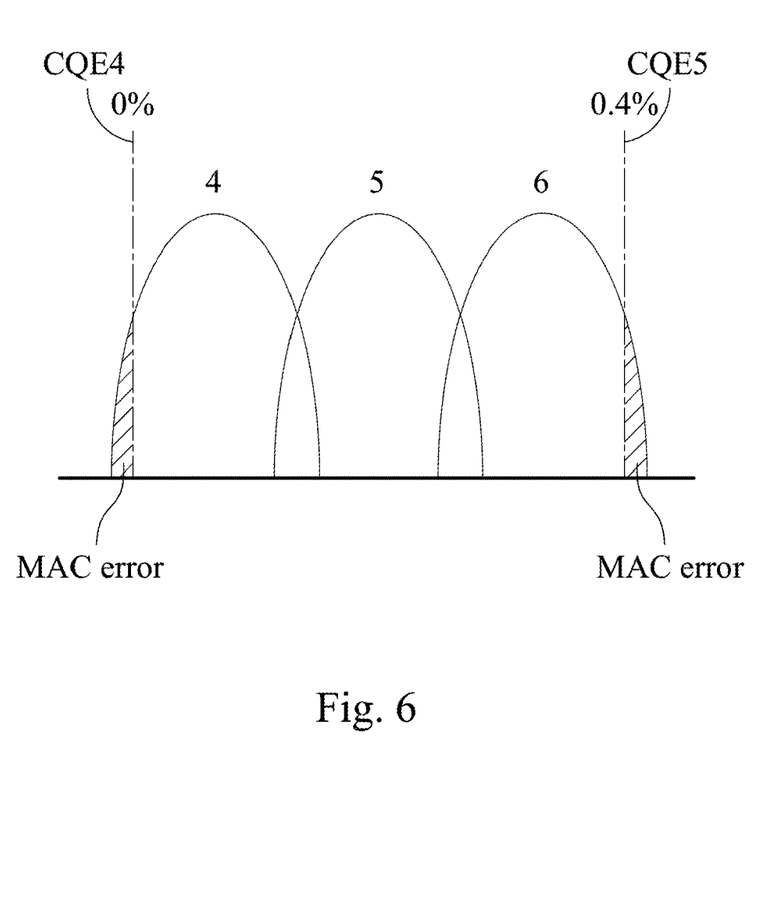
FIG. 6 shows a schematic view of a MAC error rate of one of a plurality of changed quantization levels according to a fourth embodiment of the present disclosure.

FIG. 4 shows a flow chart of a quantization method 100a for a plurality of partial sums of a convolution neural network based on a CIM hardware according to a second embodiment of the present disclosure. FIG. 5 shows a schematic view of a multiply-and-accumulate (MAC) error rate of one of a plurality of quantization levels according to a third embodiment of the present disclosure. FIG. 6 shows a schematic view of a changed MAC error rate of one of a plurality of changed quantization levels according to a fourth embodiment of the present disclosure. In FIG. 4, the quantization method 100a includes a probability-based quantizing step S100a and a margin-based quantizing step S200a.

The probability-based quantizing step S100a includes a network training step S110a, a distribution counting step S120a, a quantization-level generating step S130a, a first error rate obtaining step S140a, a partial-sum quantizing step S150a, a first network retraining step S160a and a first accuracy generating step S170a.

In FIG. 4, the detail of the network training step S110a, the quantization-level generating step S130a, the partial-sum quantizing step S150a, the first network retraining step S160a and the first accuracy generating step S170a is the same as the network training step S110, the quantization-level generating step S120, the partial-sum quantizing step S130, the first network retraining step S140 and the first accuracy generating step S150 of FIG. 1, respectively, and will not be described again herein. In FIG. 4, the probability-based quantizing step S100a further includes the distribution counting step S120a and the first error rate obtaining step S140a.

The distribution counting step S120a includes counting a partial-sum distribution of each of the partial sums in the convolution neural network. When the partial sums are greater than or equal to 0, the larger one of the partial sums is, the wider the partial-sum distribution of the one of the partial sums is, so that an error rate of the one of the partial sums is higher.

The first error rate obtaining step S140a includes obtaining the MAC error rate of each of the quantization levels according to the partial-sum distribution of each of the partial sums and the quantization edge of each of the quantization levels. The MAC error rate of one of the quantization levels is equal to a sum of areas of MAC errors divided by a sum of areas of the partial-sum distributions of the partial sums in the one of the quantization levels, as shown in FIG. 5. In the embodiment of FIG. 5, there are two MAC errors occurred in a left side of the fourth quantization edge QE4 and a right side of the fifth quantization edge QE5, respectively.

The margin-based quantizing step S200a includes a quantization edge changing step S210a, a second error rate obtaining step S220a, a second network retraining step S230a, a second accuracy generating step S240a and an accuracy checking step S250a.

In FIG. 4, the detail of the quantization edge changing step S210a, the second network retraining step S230a and the second accuracy generating step S240a is the same as the quantization edge changing step S210, the second network retraining step S220 and the second accuracy generating step S230 of FIG. 1, respectively, and will not be described again herein. In FIG. 4, the margin-based quantizing step S200a further includes the second error rate obtaining step S220a and the accuracy checking step S250a.

The second error rate obtaining step S220a includes obtaining a changed MAC error rate of each of the changed quantization levels according to the partial-sum distribution of each of the partial sums and the changed quantization edge of each of the changed quantization levels. The changed MAC error rate of one of the changed quantization levels is equal to a sum of areas of MAC errors divided by a sum of areas of the partial-sum distributions of the partial sums in the one of the changed quantization levels, as shown in FIG. 6. In the embodiment of FIG. 6, there are two MAC errors occurred in a left side of the fourth changed quantization edge CQE4 and a right side of the fifth changed quantization edge CQE5, respectively. In FIGS. 5 and 6, because the fifth quantization edge QE5 is moved in the right direction by one reference position to form the fifth changed quantization edge CQE5, the changed MAC error rate of the one of the changed quantization levels is smaller than the MAC error rate of the one of the quantization levels, and the one of the quantization levels is corresponding to the one of the changed quantization levels. However, the quantization edge cannot be moved in the right direction without restriction. Therefore, the accuracy checking step S250a of the present disclosure is performed to determine the appropriate value for the changed quantization edge.

The accuracy checking step S250a includes checking whether the second accuracy value of the second accuracy generating step S240a is greater than the first accuracy value of the first accuracy generating step S170a to determine changing of the quantization edge in the quantization edge changing step S210a during a first iteration. The accuracy checking step S250a further includes checking whether an i+1th accuracy value of the second accuracy generating step S240a is greater than an ith accuracy value of the second accuracy generating step S240a during an ith iteration, where i is a positive integer and greater than 1. In the accuracy checking step S250a, in response to determining that the second accuracy value is greater than the first accuracy value during the first iteration, the quantization edge changing step S210a, the second error rate obtaining step S220a, the second network retraining step S230a and the second accuracy generating step S240a are re-performed to form a second iteration. In response to determining that the second accuracy value is smaller than or equal to the first accuracy value during the first iteration, the probability-based quantizing step S100a and the margin-based quantizing step S200a are stopped. In addition, in the accuracy checking step S250a, in response to determining that the i+1th accuracy value is greater than the ith accuracy value during the ith iteration, the quantization edge changing step S210a, the second error rate obtaining step S220a, the second network retraining step S230a and the second accuracy generating step S240a are re-performed to form the i+1th iteration.

Table 1 lists the partial sums and the first quantized partial sums of FIG. 2. The range of the partial sums is set from 0 to 81. The first quantized partial sums corresponding to the partial sums from −1 to −81 (not shown) are respectively equal to the first quantized partial sums corresponding to the partial sums from 1 to 81. Table 2 lists the partial sums and the second quantized partial sums of FIG. 3. The accuracy value is dominated by the quantization error and the MAC error rate. When the quantization edge is moved in the moving direction to form the changed quantization edge, the MAC error rate is decreased, and the quantization error is increased. Accordingly, the accuracy checking step S250a of the present disclosure may be performed by iterative operations to determine the appropriate value for the changed quantization edge.

TABLE 1

| partial sums | 0 | 1 | 2 | 3 | 4 | 5 | 6 | 7 | 8 | 9 | 10 |
|---|---|---|---|---|---|---|---|---|---|---|---|
| first quantized partial sums | 0 | 1 | 2 | 3 | 4.5 | 4.5 | 7.5 | 7.5 | 7.5 | 7.5 | 13 |
| partial sums | 11 | 12 | 13 | 14 | 15 | 16 | 17 | 18 | 19 | 20 | 21 |
| first quantized partial sums | 13 | 13 | 13 | 13 | 13 | 13 | 13 | 13 | 13 | 13 | 13 |
| partial sums | 22 | 23 | 24 | 25 | 26 | 27 | 28 | 29 | 30 | 31 | 32-81 |
| first quantized partial sums | 13 | 13 | 13 | 25 | 25 | 25 | 25 | 25 | 25 | 25 | 25 |

TABLE 2

| partial sums | 0 | 1 | 2 | 3 | 4 | 5 | 6 | 7 | 8 | 9 | 10 |
|---|---|---|---|---|---|---|---|---|---|---|---|
| second quantized partial sums | 0 | 1 | 2 | 3 | 5 | 5 | 5 | 8 | 8 | 8 | 8 |
| partial sums | 11 | 12 | 13 | 14 | 15 | 16 | 17 | 18 | 19 | 20 | 21 |
| second quantized partial sums | 8 | 8 | 16 | 16 | 16 | 16 | 16 | 16 | 16 | 16 | 16 |
| partial sums | 22 | 23 | 24 | 25 | 26 | 27 | 28 | 29 | 30 | 31 | 32-81 |
| second quantized partial sums | 16 | 16 | 16 | 16 | 16 | 16 | 16 | 16 | 16 | 31 | 31 |

In one embodiment, the accuracy value of the probability-based quantizing step S100a without the MAC error rates is 90.01%, and the accuracy value of the probability-based quantizing step S100a with the MAC error rates is 87.49%. The accuracy value of the margin-based quantizing step S200a without the MAC error rates is 89.97%, and the accuracy value of the margin-based quantizing step S200a with the MAC error rates is 88.48%. The accuracy value of the margin-based quantizing step S200a with the MAC error rates is 1% higher than the accuracy value of the probability-based quantizing step S100a with the MAC error rates. Therefore, the quantization method 100a of the present disclosure can determine the quantization edges by the probability-based quantizing step S100a, and then fine-tune the quantization edges to form the changed quantization edges by the margin-based quantizing step S200a, thereby reducing the MAC error rates of the CIM hardware. After considering the MAC error rates of the CIM hardware, the accuracy value of the convolution neural network of the margin-based quantizing step S200a combined with the probability-based quantizing step S100a can be improved by 1% compared with the accuracy value of the convolution neural network of the probability-based quantizing step S100a.

Figure 7:
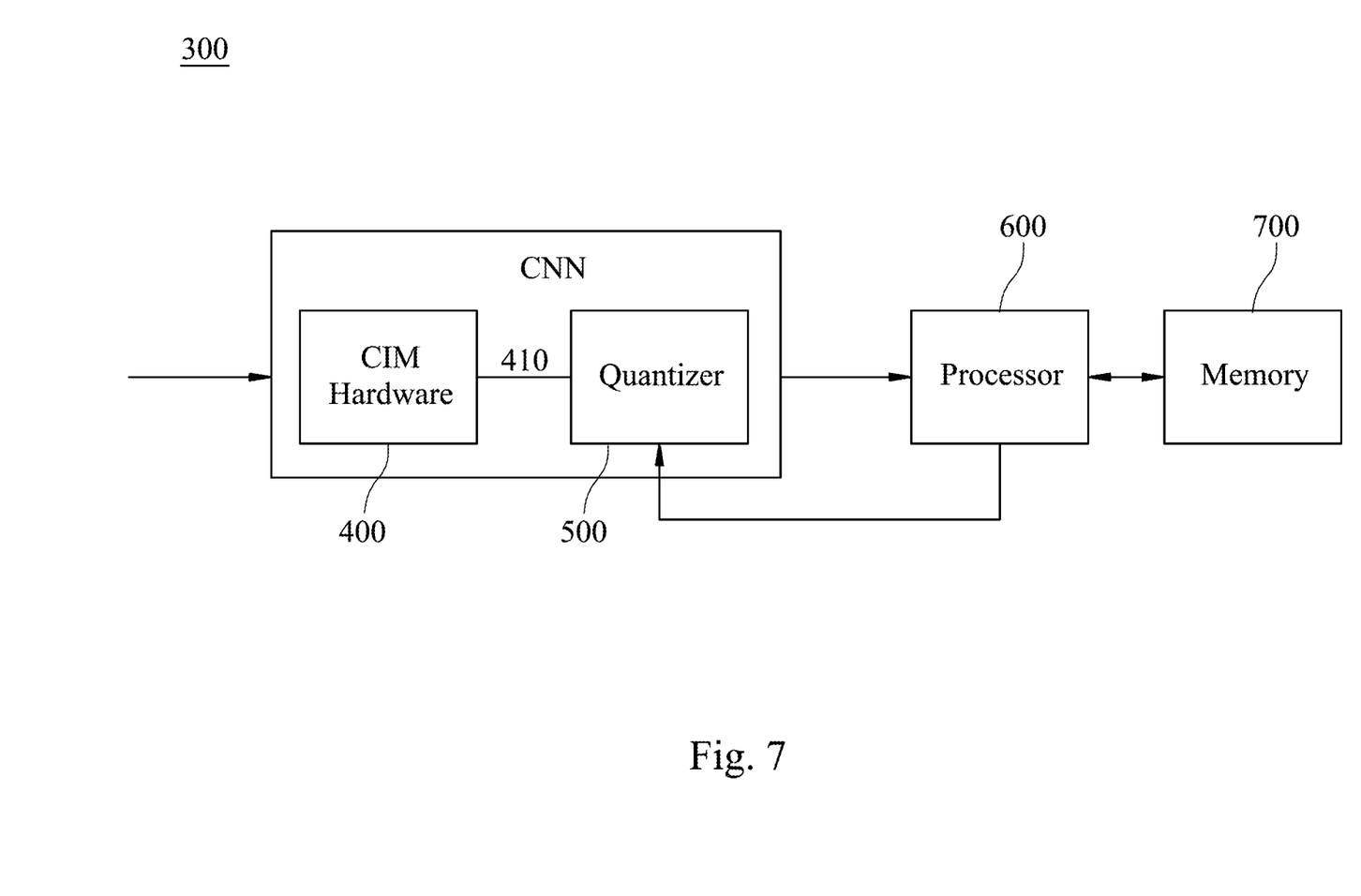
FIG. 7 shows a block diagram of a system of a quantization method for a plurality of partial sums of a convolution neural network based on a CIM hardware according to a fifth embodiment of the present disclosure.

FIG. 7 shows a block diagram of a system 300 of each of the quantization methods 100, 100a for a plurality of partial sums 410 of a convolution neural network CNN based on a CIM hardware 400 according to a fifth embodiment of the present disclosure. The system 300 includes the CIM hardware 400, a quantizer 500, a processor 600 and a memory 700. The CIM hardware 400 is signally connected to the quantizer 500, i.e., the CIM hardware 400 transmits the partial sums 410 to the quantizer 500 for quantization. The CIM hardware 400 and the quantizer 500 are configured to perform the convolution neural network CNN. The quantizer 500 may include a plurality of sense amplifiers, but the present disclosure is not limited thereto. The processor 600 is signally connected between the memory 700 and the quantizer 500. The processor 600 is configured to implement one of the quantization methods 100, 100a, and generate a jth accuracy value, where j is a positive integer. The quantizer 500 is configured to change the quantization edge of at least one of the quantization levels according to the jth accuracy value of the processor 600. The processor 600 may be a computer, a microprocessor or a mobile device, but the present disclosure is not limited thereto. The quantization method 100 includes a probability-based quantizing step S100 and a margin-based quantizing step S200, as shown in FIG. 1. The quantization method 100a includes a probability-based quantizing step S100a and a margin-based quantizing step S200a, as shown in FIG. 4. Therefore, the system 300 of the present disclosure can utilize the processor 600 and the memory 700 to control the quantizer 500 combined with the CIM hardware 400 via suitably adjusting the position of the quantization edges so as to achieve a better prediction accuracy value of the convolution neural network CNN.

According to the aforementioned embodiments and examples, the advantages of the present disclosure are described as follows.

1. The quantization method for the partial sums of the convolution neural network based on the CIM hardware and the system thereof of the present disclosure can determine the quantization edges by the probability-based quantizing step, and then fine-tune the quantization edges to form the changed quantization edges by the margin-based quantizing step, thereby reducing the MAC error rates of the CIM hardware. After considering the MAC error rates of the CIM hardware, the accuracy value of the convolution neural network of the margin-based quantizing step combined with the probability-based quantizing step can be improved by 1% compared with the accuracy value of the convolution neural network of the probability-based quantizing step.

2. The accuracy checking step of the quantization method of the present disclosure may be performed by iterative operations to determine the appropriate value for the changed quantization edge.

3. The system of the present disclosure can utilize the processor and the memory to control the quantizer combined with the CIM hardware via suitably adjusting the position of the quantization edges so as to achieve a better prediction accuracy value of the convolution neural network.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A quantization method for a plurality of partial sums of a convolution neural network based on a computing-in-memory hardware, comprising:
    performing a probability-based quantizing step, wherein the probability-based quantizing step comprises:
        performing a network training step, wherein the network training step comprises training the convolution neural network to generate the partial sums from the computing-in-memory hardware and then obtain a benchmark training result, and each of the partial sums is in a full precision format;
        performing a quantization-level generating step, wherein the quantization-level generating step comprises generating a plurality of quantization levels for quantizing the partial sums according to a number of each of the partial sums, and each of the quantization levels comprises a quantization edge;
        performing a partial-sum quantizing step, wherein the partial-sum quantizing step comprises quantizing the partial sums at the quantization levels to generate a plurality of first quantized partial sums;
        performing a first network retraining step, wherein the first network retraining step comprises retraining the convolution neural network with the first quantized partial sums to obtain a first training result; and
        performing a first accuracy generating step, wherein the first accuracy generating step comprises comparing the first training result with the benchmark training result to generate a first accuracy value; and
    performing a margin-based quantizing step, wherein the margin-based quantizing step comprises:
        performing a quantization edge changing step, wherein the quantization edge changing step comprises changing the quantization edge of at least one of the quantization levels to generate a plurality of second quantized partial sums;
        performing a second network retraining step, wherein the second network retraining step comprises retraining the convolution neural network with the second quantized partial sums to obtain a second training result; and
        performing a second accuracy generating step, wherein the second accuracy generating step comprises comparing the second training result with the benchmark training result to generate a second accuracy value;
    wherein the second accuracy value is greater than the first accuracy value.

2. The quantization method for the partial sums of the convolution neural network based on the computing-in-memory hardware of claim 1, wherein the quantization edge changing step further comprises:
    moving the quantization edge in a moving direction by at least one reference position so as to increase a number of the partial sums in the quantization levels, wherein the partial sums are sequentially increased in the moving direction.

3. The quantization method for the partial sums of the convolution neural network based on the computing-in-memory hardware of claim 1, wherein each of the partial sums is generated by a plurality of n-bit inputs and a plurality of m-bit weights via the computing-in-memory hardware, n is equal to 2, m is equal to 3, a range of the partial sums is set from −81 to 81, each of the partial sums has 8 bits, each of the first quantized partial sums has 4 bits, and each of the second quantized partial sums has 4 bits.

4. The quantization method for the partial sums of the convolution neural network based on the computing-in-memory hardware of claim 1, wherein the probability-based quantizing step further comprises:
    performing a distribution counting step, wherein the distribution counting step comprises counting a partial-sum distribution of each of the partial sums in the convolution neural network; and
    performing a first error rate obtaining step, wherein the first error rate obtaining step comprises obtaining a multiply-and-accumulate (MAC) error rate of each of the quantization levels according to the partial-sum distribution of each of the partial sums and the quantization edge of each of the quantization levels.

5. The quantization method for the partial sums of the convolution neural network based on the computing-in-memory hardware of claim 4, wherein in the margin-based quantizing step, the quantization edge changing step further comprises:
    changing the quantization edge of the at least one of the quantization levels to generate a plurality of changed quantization levels, wherein each of the changed quantization levels comprises a changed quantization edge.

6. The quantization method for the partial sums of the convolution neural network based on the computing-inmemory hardware of claim 5, wherein the margin-based quantizing step further comprises:

performing a second error rate obtaining step, wherein the second error rate obtaining step comprises obtaining a changed MAC error rate of each of the changed quantization levels according to the partial-sum distribution of each of the partial sums and the changed quantization edge of each of the changed quantization levels;

wherein the changed MAC error rate of one of the changed quantization levels is smaller than the MAC error rate of one of the quantization levels, and the one of the quantization levels is corresponding to the one of the changed quantization levels.

7. A quantization method for a plurality of partial sums of a convolution neural network based on a computing-in-memory hardware, comprising:

performing a probability-based quantizing step, wherein the probability-based quantizing step comprises:

performing a network training step, wherein the network training step comprises training the convolution neural network to generate the partial sums from the computing-in-memory hardware and then obtain a benchmark training result, and each of the partial sums is in a full precision format;

performing a quantization-level generating step, wherein the quantization-level generating step comprises generating a plurality of quantization levels for quantizing the partial sums according to a number of each of the partial sums, and each of the quantization levels comprises a quantization edge;

performing a partial-sum quantizing step, wherein the partial-sum quantizing step comprises quantizing the partial sums at the quantization levels to generate a plurality of first quantized partial sums;

performing a first network retraining step, wherein the first network retraining step comprises retraining the convolution neural network with the first quantized partial sums to obtain a first training result; and performing a first accuracy generating step, wherein the first accuracy generating step comprises comparing the first training result with the benchmark training result to generate a first accuracy value; and performing a margin-based quantizing step, wherein the margin-based quantizing step comprises:

performing a quantization edge changing step, wherein the quantization edge changing step comprises changing the quantization edge of at least one of the quantization levels to generate a plurality of second quantized partial sums;

performing a second network retraining step, wherein the second network retraining step comprises retraining the convolution neural network with the second quantized partial sums to obtain a second training result;

performing a second accuracy generating step, wherein the second accuracy generating step comprises comparing the second training result with the benchmark training result to generate a second accuracy value; and performing an accuracy checking step, wherein the accuracy checking step comprises checking whether the second accuracy value is greater than the first accuracy value to determine changing of the quantization edge in the quantization edge changing step.

8. The quantization method for the partial sums of the convolution neural network based on the computing-in-memory hardware of claim 7, wherein in the accuracy checking step, in response to determining that the second accuracy value is greater than the first accuracy value, the quantization edge changing step, the second network retraining step and the second accuracy generating step are re-performed.

9. The quantization method for the partial sums of the convolution neural network based on the computing-in-memory hardware of claim 7, wherein in the accuracy checking step, in response to determining that the second accuracy value is smaller than or equal to the first accuracy value, the probability-based quantizing step and the margin-based quantizing step are stopped.

10. The quantization method for the partial sums of the convolution neural network based on the computing-in-memory hardware of claim 7, wherein the quantization edge changing step further comprises:

moving the quantization edge in a moving direction by at least one reference position so as to increase a number of the partial sums in the quantization levels, wherein the partial sums are sequentially increased in the moving direction.

11. The quantization method for the partial sums of the convolution neural network based on the computing-in-memory hardware of claim 7, wherein each of the partial sums is generated by a plurality of n-bit inputs and a plurality of m-bit weights via the computing-in-memory hardware, n is equal to 2, m is equal to 3, a range of the partial sums is set from −81 to 81, each of the partial sums has 8 bits, each of the first quantized partial sums has 4 bits, and each of the second quantized partial sums has 4 bits.

12. The quantization method for the partial sums of the convolution neural network based on the computing-in-memory hardware of claim 7, wherein the probability-based quantizing step further comprises:

performing a distribution counting step, wherein the distribution counting step comprises counting a partial-sum distribution of each of the partial sums in the convolution neural network; and performing a first error rate obtaining step, wherein the first error rate obtaining step comprises obtaining a multiply-and-accumulate (MAC) error rate of each of the quantization levels according to the partial-sum distribution of each of the partial sums and the quantization edge of each of the quantization levels.

13. The quantization method for the partial sums of the convolution neural network based on the computing-in-memory hardware of claim 12, wherein in the margin-based quantizing step, the quantization edge changing step further comprises:

changing the quantization edge of the at least one of the quantization levels to generate a plurality of changed quantization levels, wherein each of the changed quantization levels comprises a changed quantization edge.

14. The quantization method for the partial sums of the convolution neural network based on the computing-in-memory hardware of claim 13, wherein the margin-based quantizing step further comprises:

performing a second error rate obtaining step, wherein the second error rate obtaining step comprises obtaining a changed MAC error rate of each of the changed quantization levels according to the partial-sum distribution of each of the partial sums and the changed quantization edge of each of the changed quantization levels;
wherein the changed MAC error rate of one of the changed quantization levels is smaller than the MAC error rate of one of the quantization levels, and the one of the quantization levels is corresponding to the one of the changed quantization levels.

15. A system of a quantization method for a plurality of partial sums of a convolution neural network based on a computing-in-memory hardware, comprising:
a memory; and
a processor signally connected to the memory and configured to implement the quantization method for the partial sums of the convolution neural network based on the computing-in-memory hardware comprising:
performing a probability-based quantizing step, wherein the probability-based quantizing step comprises:
performing a network training step, wherein the network training step comprises training the convolution neural network with the partial sums to obtain a benchmark training result, and each of the partial sums is in a full precision format;
performing a quantization-level generating step, wherein the quantization-level generating step comprises generating a plurality of quantization levels for quantizing the partial sums according to a number of each of the partial sums, and each of the quantization levels comprises a quantization edge;
performing a partial-sum quantizing step, wherein the partial-sum quantizing step comprises quantizing the partial sums at the quantization levels to generate a plurality of first quantized partial sums;
performing a first network retraining step, wherein the first network retraining step comprises retraining the convolution neural network with the first quantized partial sums to obtain a first training result; and
performing a first accuracy generating step, wherein the first accuracy generating step comprises comparing the first training result with the benchmark training result to generate a first accuracy value; and
performing a margin-based quantizing step, wherein the margin-based quantizing step comprises:
performing a quantization edge changing step, wherein the quantization edge changing step comprises changing the quantization edge of at least one of the quantization levels to generate a plurality of second quantized partial sums;
performing a second network retraining step, wherein the second network retraining step comprises retraining the convolution neural network with the second quantized partial sums to obtain a second training result; and
performing a second accuracy generating step, wherein the second accuracy generating step comprises comparing the second training result with the benchmark training result to generate a second accuracy value;
wherein the second accuracy value is greater than the first accuracy value.

16. The system of claim 15, wherein the quantization edge is moved in a moving direction by at least one reference position so as to increase a number of the partial sums in the quantization levels, and the partial sums are sequentially increased in the moving direction.

17. The system of claim 15, wherein the computing-in-memory hardware is signally connected to the processor, each of the partial sums is generated by a plurality of n-bit inputs and a plurality of m-bit weights via the computing-in-memory hardware, n is equal to 2, m is equal to 3, a range of the partial sums is set from −81 to 81, each of the partial sums has 8 bits, each of the first quantized partial sums has 4 bits, and each of the second quantized partial sums has 4 bits.

18. The system of claim 15, wherein, wherein the probability-based quantizing step further comprises:
performing a distribution counting step, wherein the distribution counting step comprises counting a partial-sum distribution of each of the partial sums in the convolution neural network; and
performing a first error rate obtaining step, wherein the first error rate obtaining step comprises obtaining a multiply-and-accumulate (MAC) error rate of each of the quantization levels according to the partial-sum distribution of each of the partial sums and the quantization edge of each of the quantization levels.

19. The system of claim 18, wherein in the margin-based quantizing step, the quantization edge changing step further comprises:
changing the quantization edge of the at least one of the quantization levels to generate a plurality of changed quantization levels, wherein each of the changed quantization levels comprises a changed quantization edge.

20. The system of claim 19, wherein the margin-based quantizing step further comprises:
performing a second error rate obtaining step, wherein the second error rate obtaining step comprises obtaining a changed MAC error rate of each of the changed quantization levels according to the partial-sum distribution of each of the partial sums and the changed quantization edge of each of the changed quantization levels;
wherein the changed MAC error rate of one of the changed quantization levels is smaller than the MAC error rate of one of the quantization levels, and the one of the quantization levels is corresponding to the one of the changed quantization levels.

* * * * *